United States Patent [19]

Jullien-Davin

[11] 3,738,060

[45] June 12, 1973

[54] PLANT SUPPORT WITH WATERING TUBE SPIRALLING THEREAROUND

[75] Inventor: Jean Jullien-Davin, Valence, France

[73] Assignee: Crouzet, Paris, France

[22] Filed: Mar. 1, 1972

[21] Appl. No.: 230,819

[30] Foreign Application Priority Data
Mar. 5, 1971 France ................................. 7108001

[52] U.S. Cl. .................................. 47/38.1, 47/47
[51] Int. Cl. ............................................ A01g 27/00
[58] Field of Search ........................ 47/38, 38.1, 47

[56] References Cited
UNITED STATES PATENTS

| | | | |
|---|---|---|---|
| 2,306,027 | 12/1942 | Swaney | 47/38 |
| 2,556,522 | 6/1951 | Cienfuenos | 47/38.1 |
| 3,512,712 | 5/1970 | Benesch | 47/38 X |
| 1,453,401 | 5/1923 | Mattson | 47/38 |
| 3,452,475 | 7/1969 | Johnson | 47/38 |
| 3,188,771 | 6/1965 | Ballai | 47/38.1 X |
| 3,471,968 | 10/1969 | Letz | 47/47 |
| 3,357,129 | 12/1967 | Torrence | 47/47 X |

Primary Examiner—Robert E. Pulfrey
Assistant Examiner—E. M. Coven
Attorney—John C. Holman and Marvin R. Stern

[57] ABSTRACT

Device for the automatic spraying of household plants, in particular creepers along a moss-lined support which moss must be maintained in a humid condition, comprising a water tank, an electric pump with a suction tube immersed in the tank, a discharge tube connected to the pump, said discharge tube being water tight in a first ascending part rising to the top of the support, and then porous in a second descending part winding into a spiral around the support and then water tight in a third descending part returning to the tank, a textile wick being arranged along the support in contact with at least one part of said porous part of the discharge tube and extending towards the bottom of the earth in the pot.

3 Claims, 2 Drawing Figures

PATENTED JUN 12 1973
3,738,060
FIG_1_
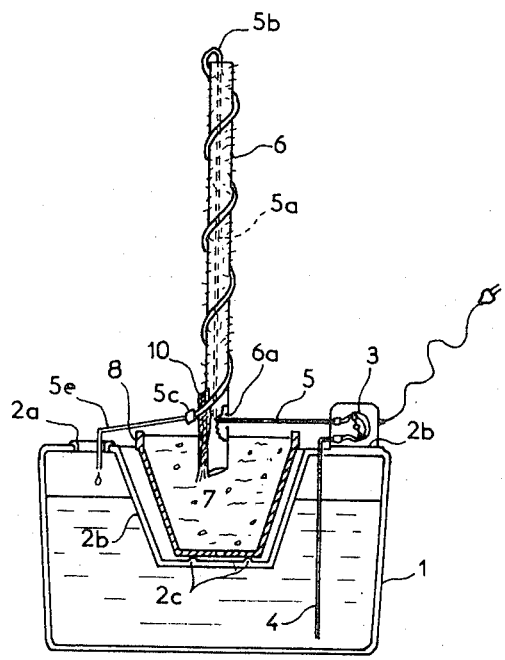
FIG_2_
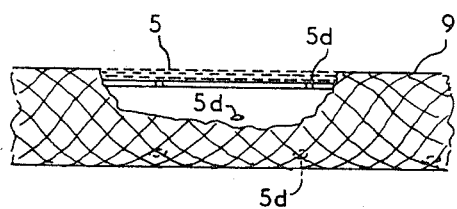

PLANT SUPPORT WITH WATERING TUBE SPIRALLING THEREAROUND

The invention relates to a spraying device for a plant in a pot particularly adapted for spraying creepers on a moss-lined support.

Pots are known for household plants in which a water reserve contained in a lower compartment makes it possible to provide a suitable humidity level to the earth in the pot due to a wick whose lower end bathes in the water and whose upper end leads into the earth.

These known devices are satisfactory for most household plants but are not usable in the very widespread case in which certain creepers are to be sprayed along a moss-lined support, which moss must itself be maintained in a humid state.

This involves a problem to be solved which consists in bringing a certain quantity of water at the top of the moss-lined support so as to maintain the latter in a humid state without, however, causing the earth in the pot in which the support is embedded to be sprayed in an overabundant fashion, which would cause the roots of the plant to rot.

To this effect, the invention relates to a device for the automatic spraying of household plants, in particular, creepers along a moss-lined support which moss must be maintained in a humid state, comprising a water tank, an electric pump with an aspirating tube immersed in the tank, a discharge tube connected to the pump, said discharge tube being water-tight in a first ascending part rising to the top of the support and then porous in a second descending part winding into a spiral around the support and then water-tight in a third descending part returning to the tank, a textile wick being set out along the support in contact with at least one portion of said porous part of discharge tube and extending downwards in the earth of the pot.

The tank suitably comprises in its upper part, a conical cavity acting as a flower-pot case.

The descending part of the tube comprising pores is housed in a textile sheath made of a synthetic rot-proof material so that almost all the water runs down through the tube and a small quantity proceeds by capillary action to the outside of the tube in the tissue of the sheath in contact with the moss.

The invention will be more fully understood with reference to the appended drawing given as a non restrictive example.

In the drawing,

FIG. 1 shows a sectional view of the water tank and the conventional flower pot; in order for the drawing to appear more clearly, the creeper has not been shown.

FIG. 2 shows an enlarged detailed view of the descending non water tight part of the tube.

A tank 1 of any shape, made by molding of an economical plastic material, comprises the water reserve.

The upper wall 2 of the tank comprises a filling orifice 2a and a boss 2b on which is attached, by any suitable means an electric pump 3, preferably of the well known economic type in which movable rollers propagate crushing points in a flexible tube in the direction of flow.

A suction tube 4 connected to pump 3 is immersed to a point close to the bottom of tank 1. A discharge tube 5 connected to the pump raises water discharged up to the top of the moss-lined support 6 whose lower end is immersed in the earth 7 filling a conventional pot 8.

In general, this type of support consists of a hollow plastic tube. Tube 5 will be suitably caused to enter through an orifice 6a at the base of support 6 so as to hide from view the rising part 5a of tube 5.

Between an upper point 5b and a lower point 5c, tube 5 descends in a spiral along support 6, shows perforations 5d and is housed in a textile sheath 9 (FIG. 2); a descending part 5e penetrates into the filling orifice 2 so as to return any excess water to the tank.

Because of perforations 5d, sheath 9 is maintained in a constantly moistened condition and, furthermore, the upper perforations 5d comprise an air inlet which makes it possible for the liquid to descend more rapidly that is required by the delivery rate of pump 3 so that the descending part 5b to 5c acts as a drain and prevents the absorption of an excessive quantity of water by sheath 9.

A wick 10 is taken under the convolutions of the humid descending part of tube 5 and extends down to the earth 7 of the pot to which it communicates the humidity through capillary action.

The upper face 2 of the reservoir comprises an alveole 2b acting as a flower-pot case the bottom of which comprises projections 2c providing, by raising the bottom of the pot, for its aeration.

What I claim is:

1. Device for the automatic spraying of household plants, in particular, creepers along a moss-lined support which moss must be maintained in a humid condition, comprising a substantially vertical support retained in an earth filled pot a water tank, an electric pump with a suction tube immersed in said tank, a discharge tube connected to said pump, said discharge tube being water tight in a first ascending part rising to the top of said support, and then porous in a second descending part winding into a spiral around said support and then water tight in a third descending part returning to the tank, a textile wick being arranged along said support in contact with at least one part of said porous part of the discharge tube and extending towards the bottom of the earth in said pot.

2. Device according to claim 1 wherein the upper surface of the tank comprises an alveole designed to receive said pot and wherein the bottom of the alveole comprises projections designed to separate the bottom of said pot from the bottom of the alveole.

3. Device according to claim 1 wherein the descending porous part of said discharge tube comprises a perforated tube surrounded by a synthetic rot-proof textile sheath.

* * * * *